United States Patent [19]

Vinegar et al.

[11] Patent Number: 5,433,271
[45] Date of Patent: Jul. 18, 1995

[54] HEAT INJECTION PROCESS

[75] Inventors: Harold J. Vinegar; Eric P. De Rouffignac, both of Houston; Lawrence J. Bielamowicz; Phillip T. Baxley, both of Bellaire, all of Tex.

[73] Assignee: Shell Oil Company, Houston, Tex.

[21] Appl. No.: 170,577

[22] Filed: Dec. 20, 1993

[51] Int. Cl.[6] .................... E21B 43/24; E21B 36/02; E21B 36/04

[52] U.S. Cl. .................... 166/272; 166/59; 166/60; 166/302

[58] Field of Search .................... 166/57, 59, 60, 245, 166/272, 302

[56] References Cited

U.S. PATENT DOCUMENTS

| | | |
|---|---|---|
| 2,902,270 | 9/1959 | Salomonsson et al. |
| 2,914,309 | 11/1959 | Salomonsson . |
| 3,181,613 | 5/1965 | Krueger . |
| 4,640,352 | 2/1987 | Vanmeurs et al. ............ 166/245 |
| 4,886,118 | 12/1989 | Van Meurs et al. ........... 166/245 |
| 5,060,287 | 10/1991 | Van Egmond ................ 392/301 |
| 5,065,818 | 11/1991 | Van Egmond ................ 166/60 |
| 5,255,742 | 10/1993 | Mikus .......................... 166/303 |
| 5,297,626 | 3/1994 | Vinegar et al. ............ 166/272 X |

FOREIGN PATENT DOCUMENTS 123137 11/1948 Sweden .

Primary Examiner—George A. Suchfield
Attorney, Agent, or Firm—Del S. Christensen

[57] ABSTRACT

A method for heat injection into a subterranean diatomite formation is provided. The method utilizes a heater that is placed directly in the diatomite formation without cement around the heater. Diatomite is very soft, and will quickly fill in around the heater, operation of the heater will sinter the diatomite and significantly increase the original thermal conductivity and strength of the diatomite.

11 Claims, 4 Drawing Sheets

HEAT INJECTION PROCESS

FIELD OF THE INVENTION

This invention relates to a method for injection of heat into a subterranean diatomite formation and an apparatus for use in such method.

BACKGROUND OF THE INVENTION

U.S. Pat. Nos. 4,640,352 and 4,886,118 disclose conductive heating of subterranean formations of low permeability that contain oil to recover oil therefrom. Such low permeability formations include hydrocarbon-bearing diatomite formations. Diatomite is a soft rock that has very high porosity but low permeability. Heat injection methods to recover oil are particularly applicable to diatomite formations because these formations are not amenable to secondary oil recovery methods such as water, steam, and carbon dioxide flooding. Flooding fluids tend to penetrate formations that have low permeabilities, preferentially through fractures. The injected fluids therefore bypass most of the hydrocarbons in the diatomite formations. In contrast, conductive heating does not require fluid transport into the formation. Oil within the formation is therefore not bypassed as in a flooding process.

When the temperature of a formation is increased by conductive heating, vertical temperature profiles will tend to be relatively uniform because formations generally have relatively uniform thermal conductivities and specific heats. Transportation of hydrocarbons in a thermal conduction process is by pressure drive, vaporization, and thermal expansion of oil and water trapped within the pores of the formation rock. Hydrocarbons migrate through small fractures created by the expansion and vaporization of the oil and water.

Considerable effort has been expended to develop electrical resistance heaters suitable for injecting heat into formations having low permeability for thermal conductive heating of such formations. U.S. Pat. Nos. 5,065,818 and 5,060,287 are exemplary of such effort. U.S. Pat. No. 5,065,818 discloses a heater design that is cemented directly into a formation to be heated, eliminating the cost of a casing in the formation. However, a relatively expensive cement such as a high-alumina refractory cement is needed.

Gas-fueled well heaters which are intended to be useful for injection of heat into subterranean formations are disclosed in, for example, U.S. Pat. Nos. 2,902,270, and 3,181,613 and Swedish Patent No. 123,137. The heaters of these patents require conventional placement of casings in the formations to house the heaters. Because the casings and cements required to withstand elevated temperatures are expensive, the initial cost of such heaters is high.

U.S. Pat. No. 5,255,742 (application Ser. No. 896,861 filed Jun. 19, 1992) and U.S. Pat. No. 5,297,626 (application Ser. No. 896,864 filed Jun. 19, 1992,) disclose fuel gas-fired subterranean heaters. The heaters of these patents utilize flameless combustion to eliminate hot spots and reduce the cost of the heater, but still use high alumina refractory cements to set the burner within the formation.

When heaters are cemented into a formation for the purpose of heating the formation, the cement must be uniform. It is very difficult to cement such an apparatus into a wellbore without leaving some voids around the heater. The voids will prevent uniform heat transfer from the wellbore, and could result in premature failure of the heaters in the vicinity of the voids. Further, voids in cement result in unsupported portions of the heater. These unsupported portions are weak points that will fail if the burners are subjected to stress by, for example, subsidence due to withdrawal of hydrocarbons from the surrounding formation. Cement for heat injection wells, preferably, has high thermal conductivity. High alumina cements have such high conductivity but are expensive and high alumina cement slurries have very high densities. High density slurries can fracture diatomite formations.

It is therefore an object of the present invention to provide a method and apparatus to inject heat into a subterranean diatomite formation using a heater that does not require expensive cements or casing materials. It is a further object of the invention to provide a method and apparatus wherein a smaller wellbore is possible, thus reducing drilling costs. Another object of the invention is to provide a method and apparatus wherein the sintered diatomite results in a stable high temperature sheath around the well.

SUMMARY OF THE INVENTION

These and other objects are accomplished by a method for heating a subterranean diatomite formation, the method comprising:
 drilling a wellbore into the diatomite formation;
 inserting a heater into the wellbore;
 permitting the diatomite to close up around the heater without cementing at least a major portion of the heater into the formation; and
 firing the heater and thereby sintering the diatomite in the vicinity of the heater.

Elimination of cement significantly reduces the cost of providing the heater, and the diatomite formation will uniformly close in around the heater resulting in more uniform conduction of heat from the heater than would result from a heater cemented into place. Diatomite around the heater will sinter upon exposure to elevated temperatures, become relatively strong and creep resistant, and have a significantly improved thermal conductivity compared to the original diatomite formation.

The heater can be, for example, an electrical heater, or a gas-fired heater. A gas-fired heater is preferred because of reduced operating costs. A gas-fired heater utilizing continuous flameless combustion is particularly preferred because of the savings in the cost of materials.

Figure 1:
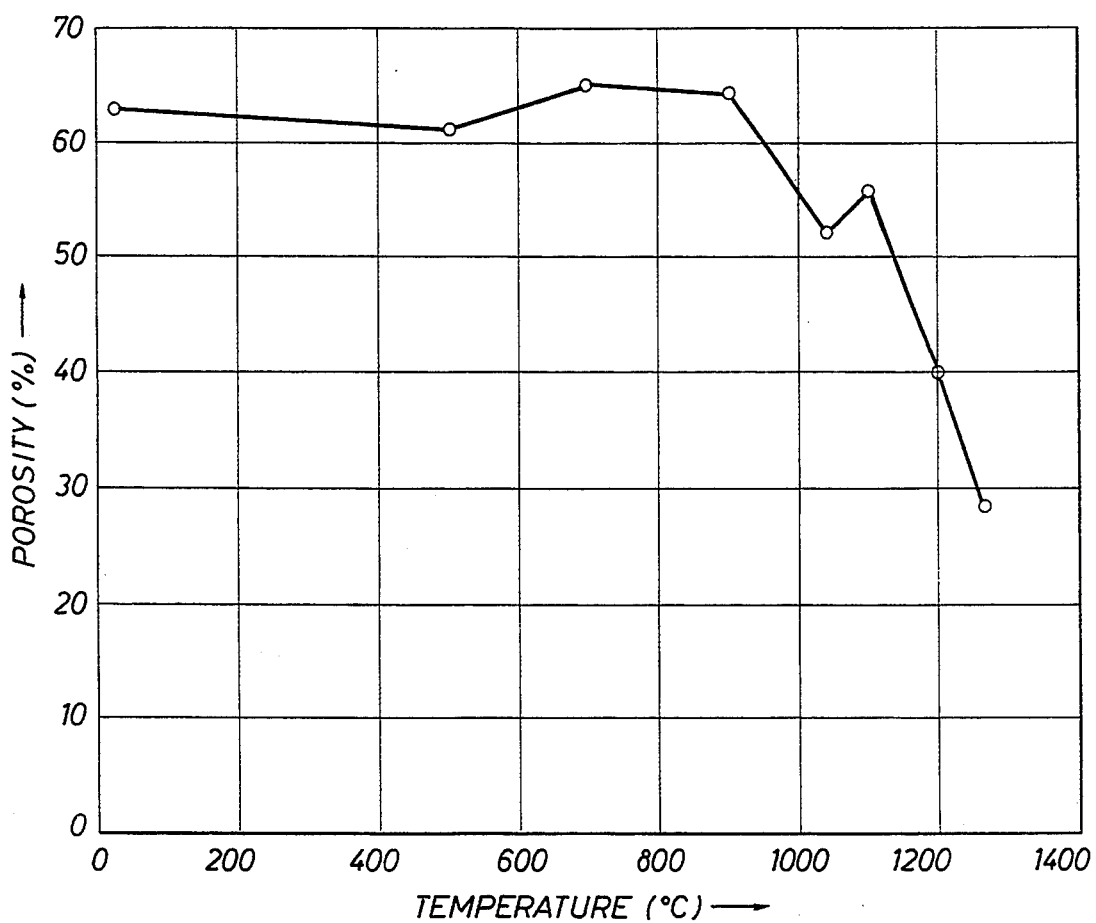
FIG. 1 is a plot of the porosity of diatomite as it is exposed to higher temperatures at atmospheric pressure.

5A and 5B show an embodiment of a combustion air and combustion gas return conduit according to the present invention.

DETAILED DESCRIPTION OF THE INVENTION

Diatomite, being a soft and malleable rock, will fill voids when a wellbore is drilled through a diatomite formation that is exposed to lateral stresses. Typically, after a well is drilled, a casing is placed and cemented in the formation without much delay or the formation will close and the casing will not fit in the borehole. In the method of the present invention, a wellbore is drilled using well known techniques, and then a heater is placed within the wellbore. The formation will close tightly around the heater. In a typical Belridge diatomite formation having about 60% porosity, a 10-inch diameter borehole will close to less than 8 inches in several days. Formations with stronger diatomites or less lateral stresses may require somewhat longer time to close tightly around the heater. The amount of time required for a particular formation may be estimated by calipering a wellbore at intervals after drilling using known methods of caliper logging of wellbores.

It is not necessary that the entire heater be placed in the wellbore without cement but at least a major portion should be placed in the wellbore without cement in order to realize the advantages of the present invention. A major portion, as the term is used herein, means more than half. It is more preferred that at least 90% of the length of the heater not be surrounded by cement.

The rate at which the formation closes around the heater may be maximized by reducing the static head within the wellbore during the period during which the formation is closing around the heater. This can be accomplished by reducing the height of drilling fluid in the wellbore, or reducing the density of the fluid. Alternatively, replacement of drilling fluid with a fluid that does not contain fluid loss additives and does not have properties that inhibit fluid loss will cause the wellbore pressure to equalize with the formation pore pressure and thereby be minimal.

After the diatomite formation has closed around the heater, the heater is fired to sinter the diatomite in the vicinity of the heater. Heating diatomite to temperatures of about 1800° F. (982° C.) causes the diatomite to change crystal structure. Initially, the composition of a typical diatomite, as determined by X-ray diffraction, is about 50% by weight Opal-A (amorphous) and about 20 to 25% by weight Opal-CT (crystalline). The remaining components are divided among sodium-Feldspar, illite, quartz, pyrite, cristabalite and hematite. After the diatomite is heated to about 1000° C., the composition is almost 90% by weight Opal-CT.

Sintering the diatomite can dramatically decrease the porosity of the rock. The porosity of a typical diatomite is initially about 62%. Upon heating, this porosity rapidly decreases starting at about 1470° F. (815° C.). The porosity of diatomite that has been heated to about 2200° F. (1204° C.) without stress is about 28%. With normal formation lateral stress imposed, this porosity decreases to less than 20% of the volume of the rock.

FIG. 1 is a plot of the porosity of a diatomite rock after the rock has been heated to varying temperatures while exposed to atmospheric pressure. The bulk density of the diatomite increases inversely with the decrease in porosity of the diatomite. Thermal conductivity at about 1400° F. (760° C.) is about $4 \times 10^{-3}$ cal/cm/sec/C after the diatomite has been heated to above 2282° F. (1250° C.), whereas the thermal conductivity of the initial diatomite at 1400° F. (760° C.) is about $0.6 \times 10^{-3}$ cal/cm/sec/C. Having sintered the diatomite is therefore important in providing a heater capable of injecting heat into the formation.

In an hydrocarbon-bearing diatomite, there will be coking of hydrocarbon components near the wellbore. This will also result in actual near-wellbore diatomites having more improvement in thermal conductivity, strength, and less porosity than the results of these tests would indicate.

Upon initial firing of the heater, the heater is preferably first brought to a temperature of about 1600° F. (871° C.). At this temperature the time to creep failure is 100,000 hours or greater for many high temperature alloys at 1000 psi stress. The heater is maintained at that temperature until nearly steady-state temperatures are achieved in the immediate vicinity of the borehole. This can be, for example, about one to six months. The temperature is then quickly raised to about 1900° F. (1038° C.) or greater and allowed to stay at that level for a sintering period of about one to thirty days. This will propagate a heat front away from the well resulting in sintering of the diatomite about 3 to 6 inches radially away from the wellbore. The sintering period must be long enough to propagate a zone of temperatures of 1700° F. (927° C.) or greater to a significant distance from the wellbore. The temperature is then reduced to about 1700° F. (927° C.) or less than about 1800° F. (982° C.), for an extended time period, preferably for the duration of the thermal conduction process which can be, for example, about ten years. Although sintering may occur only to a radial distance of about 6 inches, porosity reduction can occur to as far as five feet from the wellbore due to thermal compaction of the diatomite.

During the sintering step, the temperature of the heater material is kept below the point where immediate elastic collapse of the wellbore occurs. The pressure at which elastic collapse of the casing would be expected to occur can be estimated by using the equation:

$$\text{Collapse Pressure} = E\,h^3/(4(1-u^2)R^3)$$

where E is the Young's modulus of the heater casing at temperature, u is Poisson's ratio at temperature, R is the radius of the pipe, and h is the wall thickness of the pipe. The heater casing temperature must be kept at a temperature below that which would result in the formation stress exceeding the collapse pressure. Operation at 1900° F. (1038° C.) longer than about one to thirty days is not preferred because creep collapse of the casing may occur with most preferred high temperature alloy heater casings.

When the heater temperature is reduced to about 1600° F. (871° C.), the diatomite in the near wellbore region has sintered to a low porosity and the diatomite has converted to essentially Opal-CT. This sheath of sintered diatomite has a substantially higher thermal conductivity and a substantially greater mechanical strength and creep resistance than the original diatomite. This solid sheath gives extra strength to the wellbore and prevents long term creep collapse of the casing at temperatures of about 1700° F. (927° C.). The heater can operate at somewhat lower temperatures and still achieve a high heat injectivity due to the high conductivity sheath of sintered diatomite.

When a gas fired heater is used in the present invention, the sintering step may be performed with the inside of the casing at an elevated internal pressure. This decreases the net force on the casing from the formation, and may permit operation at even higher short-term temperatures.

Figure 3:
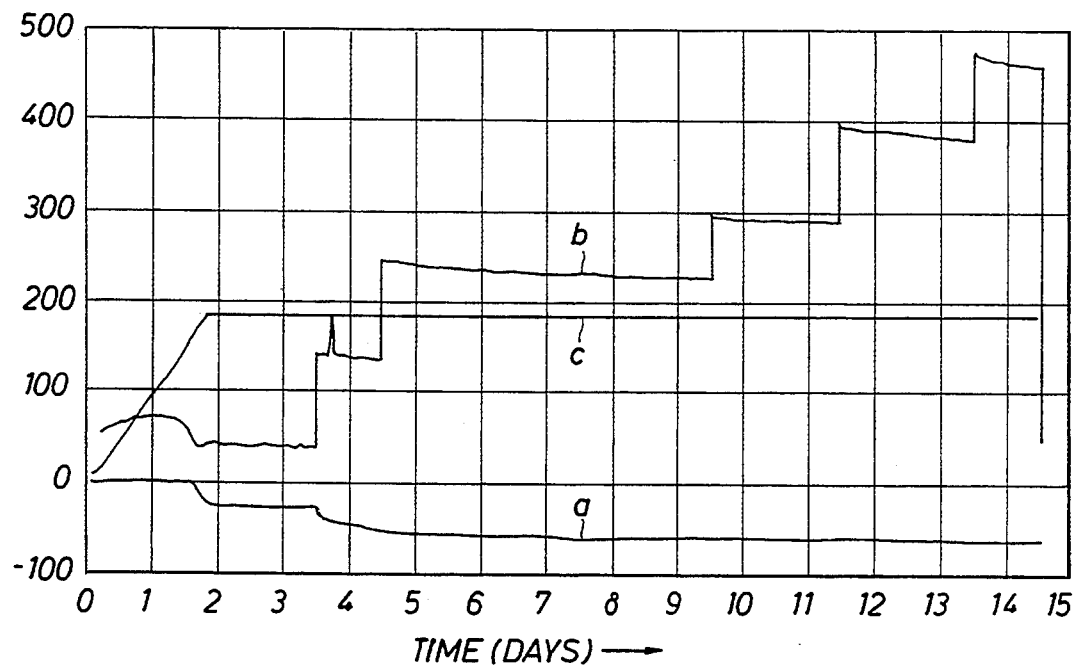
FIG. 3 is a plot of temperature, pressure and volume of a diatomite block as a function of time.

The effect of elevated temperatures at higher pressures on a diatomite rock were demonstrated by elevating the temperature of a block of diatomite from room temperature to 1900° F. (1038° C.) over about a 36-hour period, and increasing pressure on the heated diatomite. The volume of the diatomite was recorded as the temperature and pressure were increased. FIG. 3 is a plot of pressure, temperature, and volume as a function of time for this test. With lines a, b, and c representing volume, temperature, pressure, respectively, with pressure in psia, temperature in °F.$\times 10^{-1}$, and volume in percent change from initial volume. From FIG. 3 it can be seen that heating the diatomite to 1900° F. (1038° C.) caused the volume of the rock to decrease by about 25% at a pressure of about 40 psia. Increasing the pressure on the rock to about 235 psia caused a rapid decrease in volume to about 40% of the original volume. Further increases in pressure resulted in only very small changes in volume because essentially no porosity remained. After the application of heat and pressure, the diatomite was no longer a soft, chalky, white rock but was dense, hard, dark-colored rock.

The heater of the present invention could be an electrically-fired heater such as the heater disclosed in U.S. Pat. No. 5,065,818, incorporated herein by reference. These heaters can be installed from a coiled roll and are only about 1-inch in diameter. The wellbore can, therefore, be of a relatively small diameter. The relatively small diameter wellbore minimizes drilling costs.

A preferred gas-fired heater suitable for the practice of the present invention is disclosed in U.S. Pat. No. 5,255,742 (application Ser. No. 896,861), incorporated herein by reference. This heater utilizes flameless combustion and a carbon formation suppressant. This heater configuration eliminates flames by preheating fuel gas and combustion air to above the autoignition temperature and then combining increments of fuel gas with the combustion air such that a flame does not occur at the point of mixing. The carbon formation suppressant prevents the heated fuel gases from decomposing prior to mixing with the combustion air.

The method and apparatus of the present invention are preferably utilized as a part of a method to recover oil from the diatomite according to a process such as that disclosed in U.S. Pat. No. 5,297,626, incorporated herein by reference. In this process, liquid hydrocarbons are driven from the diatomite formation in the vicinity of the heat injection well to a production wellbore. The production wellbore is preferably a fractured wellbore, and the heat injection wells are arranged in a staggered pattern on each side of the fracture.

Figure 2:
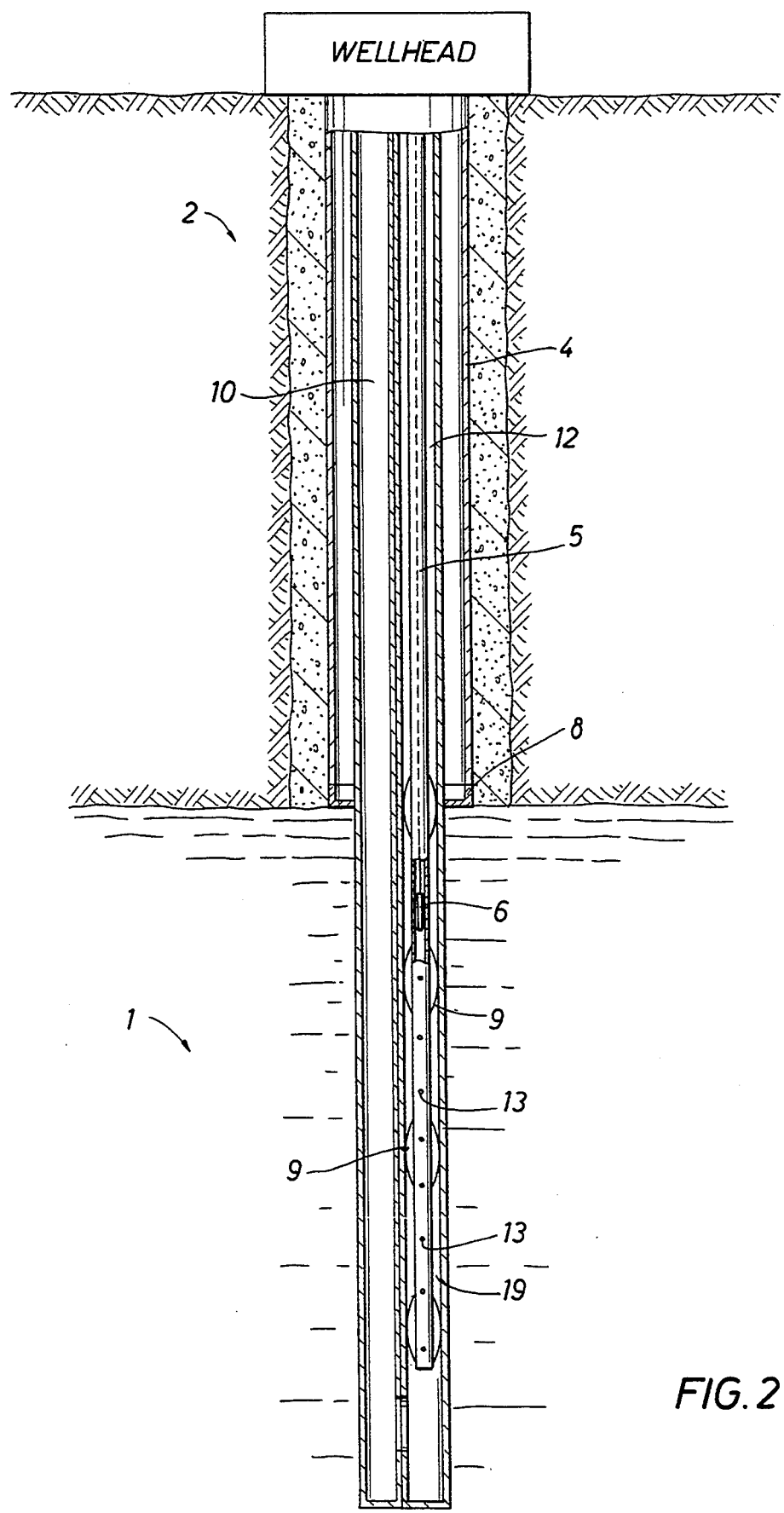
FIG. 2 shows a heater according to the present invention.

Referring now to FIG. 2, an apparatus according to the present invention is shown. At least one casing, shown as a surface casing, 4, is provided to protect surface water and overburden, 2, from contamination by contents of lower formations. Depending upon the depth of the formation, 1, from which hydrocarbons are to be recovered, other casings may be required as is known in the art.

A fuel gas conduit, 5, is shown within a combustion gas return conduit, 12. The combustion gas return conduit is in communication with a combustion air conduit, 10, near the lower portion of the diatomite formation. The combustion air conduit and the combustion gas return conduit could both be about 2⅜-inch (outside diameter) tubes of about 0.18-inch wall thickness. In the cold sections of the heater, the combustion air and the combustion gas return conduits may both be made of, for example, "HAYNES HR-120" tubes. Conduits of this diameter are preferably installed from coiled tubing rolls, and still have reasonable pressure drops. The fuel gas conduit, 5, includes a plurality of nozzles, 13, to provide for mixing and reaction of the fuel gas with the combustion air in relatively small increments. The fuel gas conduit could be, for example, a 1-inch (outside diameter) line with about a 0.109-inch wall thickness. In the cold sections of the heater, the fuel gas conduit could be a stainless steel, and in the hot section, a metal such as "INCOLOY 601 GC" could be used. The hot section could be considered to be the section below a point about 50 feet above the highest nozzle, 13. The nozzles, 13, could be holes drilled in the fuel gas conduit having about 0.029-inch diameters.

An electrical heater, 6, is shown in the fuel gas conduit located after the last mixing point to provide for ignition upon start-up.

Alternatively, fuel gas conduits and an fuel may be placed in the combustion air conduit, or both the combustion air conduit and the combustion gas return conduit. If fuel gas conduits are placed in both, the combustion gas return conduit and the combustion air conduit are preferably spread as far apart from each other as practical below the first mixing point, 19. Spreading the conduits apart from each other enables more heat to be transferred into the formation. When only one fuel gas conduit is provided, the combustion air conduit and the combustion gas return conduit are preferably close together, and most preferably, in essentially continuous contact. Providing essentially continuous contact provides for heat transfer directly between the conduits and thereby increases heat transfer to the formation during operation. Providing essentially continuous contact between the two conduits further provides for more rapid propagation of the combustion reaction. In a more preferred embodiment when a single gas line is utilized, the conduits are in continuous contact, and also connected by clamps having a high heat conductivity.

Centralizers, 9, are shown holding the fuel gas conduit, 5, centered within the combustion gas return conduit. When either one or two fuel gas conduits are provided, the combustion air conduit and the combustion gas return conduit are preferably close together and more preferably in contact with each other, above the uppermost fuel gas nozzle. Providing close proximity between these conduits facilitates heat transfer between the combustion gas returning to the surface and the combustion air enroute to the first mixing zone.

A combustion air conduit and the combustion gas return conduit are shown as being in communication near the bottom of the conduits. Both conduits preferably extend downward for a distance of at least 50 feet below the communication between the two conduits to provide for a volume for scale or other trash to fall and not interfere with the communication of gases between the two conduits.

Tubes comprising the combustion gas return conduit and the combustion air conduit can be cemented directly into the formations above the formation to be heated by methods known in the art. If the upper portions of the wellbore are cemented into the formation, a cement shoe, 8, can be provided to prevent cement from falling into the portion of the wellbore within the formation to be heated.

Preferably, a plurality of fuel gas nozzles are provided to distribute the heat release within the formation to be heated. The orifices are sized to accomplish a nearly even temperature distribution within the casing. A nearly even temperature profile within the heater results in more uniform heat distribution within the formation to be heated. A nearly uniform heat distribution within the formation will result in more efficient utilization of heat in a conductive heating hydrocarbon recovery process. A more even temperature profile will also result in the lower maximum temperatures for the same heat release. Because the materials of construction of the heater and well system dictate the maximum temperatures, even temperature profiles will increase the heat release possible for the same materials of construction.

The number of orifices is limited only by the size of orifices which are to be used. If more orifices are used, they must generally be of a smaller size. Smaller orifices will plug more easily than larger orifices. The number of orifices is a trade-off between evenness of the temperature profile and the possibility of plugging.

The preheating of the fuel gases to obtain flameless combustion could result in significant generation of carbon within the fuel gas conduit unless a carbon formation suppressant is included in the fuel gas stream. The carbon formation suppressant may be carbon dioxide, steam, hydrogen or mixtures thereof. Carbon dioxide and steam are preferred due to the generally higher cost of hydrogen. Carbon dioxide is most preferred because water vapors can condense during start-up periods and shut-down periods and wash scale from the walls of the conduits, resulting in plugged orifices. Moreover, only steam raised from highly deionized water should be used as such a carbon formation suppressant.

Figure 4:
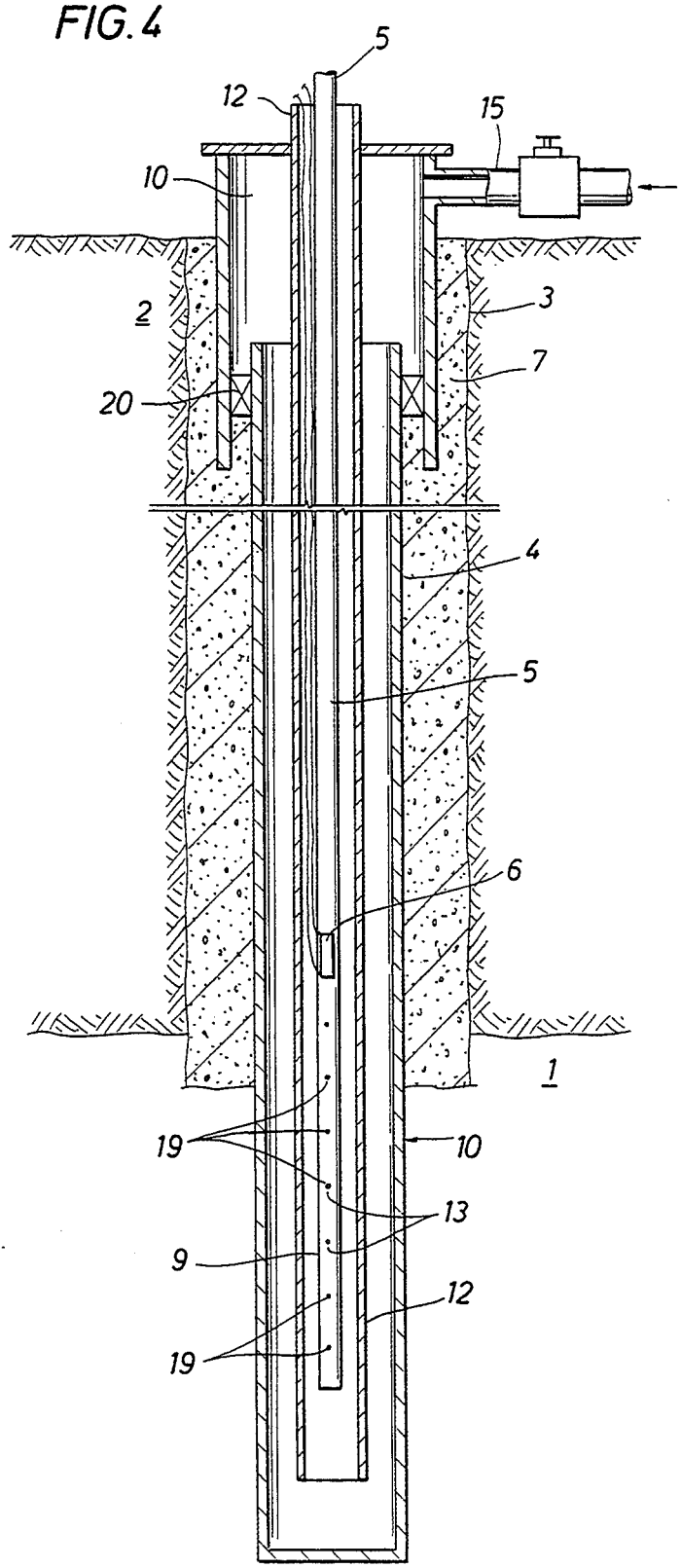
FIG. 4 is a preferred heater according to the present invention.

Referring now to FIG. 4, a preferred configuration for a burner of the present invention is shown. Elements corresponding to those of FIG. 2 are like-numbered. FIG. 4 shows a burner having a concentric configuration rather than the U-tube configuration of FIG. 2. Combustion air travels down a combustion air conduit, 10, and mixes with fuel gas at mixing points, 19. A combustion gas return conduit, 12, is provided within the combustion air conduit. In the portion of the burner above the last mixing zone, and above the diatomite formation to be heated, the combustion air conduit maybe cemented into the formation. Within the formation to be heated, the combustion air conduit is a liner initially suspended into the formation to be heated. The formation will close tightly around the combustion air conduit after it is initially hung in place. A packer, 20, will provide a seal between the formation and the combustion air conduit contents. The configuration of FIG. 4 is preferred because of its simplicity and because of good heat transfer that would occur between hot combustion gases rising in the combustion gas return conduit and cold combustion air coming down the combustion air conduit.

Figure 5B:
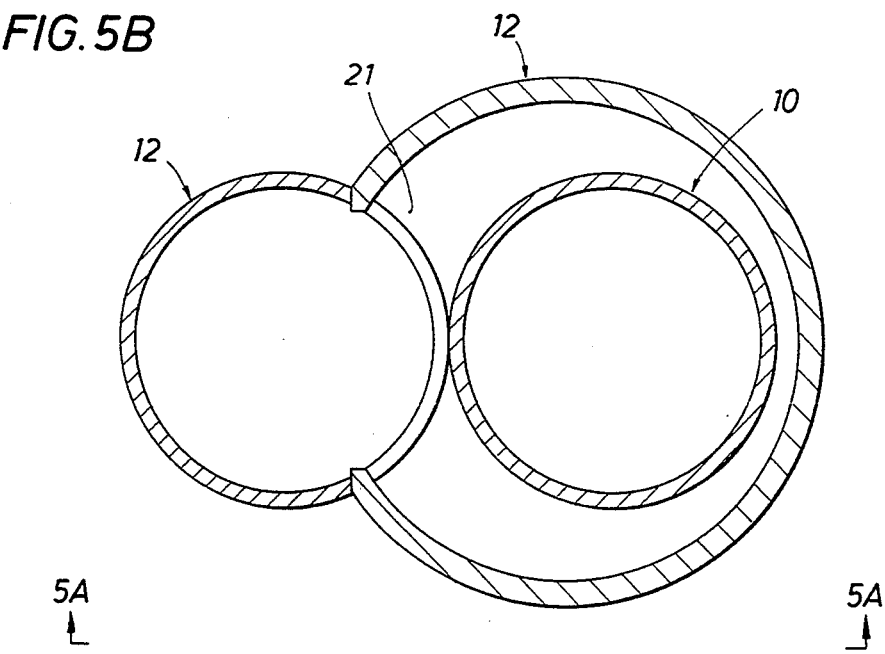
Figure 5A:
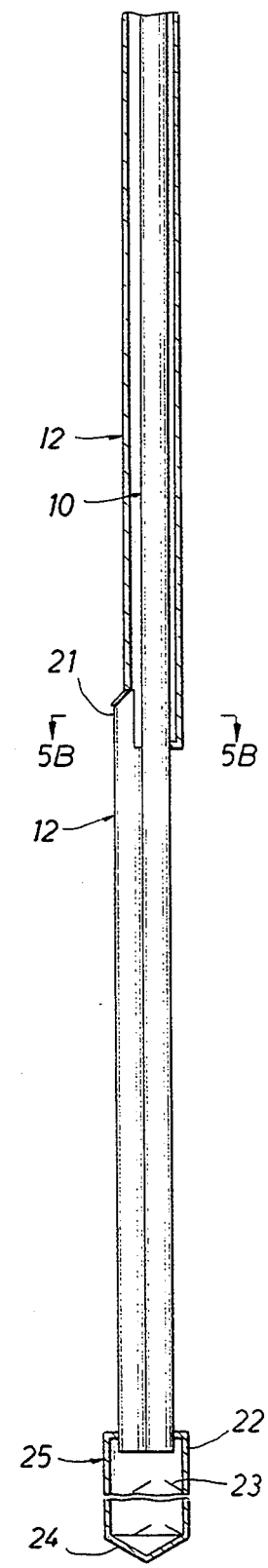

Referring now to FIG. 5A and 5B, another embodiment of a combustion air and combustion gas return conduit of the present invention is shown. Elements corresponding to those of FIG. 2 or FIG. 4 are like-numbered. Heat transfer between the combustion gas return and the combustion air supply can be very slow in a U-tube configured burner such as that of FIG. 2, so it could be advantageous to provide a concentric tube arrangement above the formation to be heated, and a U-tube within the formation to be heated. A crossover, 21, is shown in profile in FIG. 5A and in plan cross section in FIG. 5B. This arrangement preserves the advantage of minimal diameter conduits of the U-tube configuration within the formation to the heated, and still provides for improved heat transfer between combustion gas return and combustion air above the formation to be heated.

FIG. 5A also shows a preferred connection, 22, between the lower ends of the combustion air conduit, 10, and the combustion gas return conduit, 12. This connection provides a larger diameter pipe section, 25, containing baffles, 23, to decrease the velocity of the gases passing through the connection, a pointed or rounded bottom, 24, and the conduits entering from the top. This connection can provide ample volume for trash to collect and will provide for a strong connection between the two conduits.

Heat injectors utilizing flameless combustion of fuel gas at temperature levels of about 1650° F. (900° C.) to about 2000° F. (1093° C.) may be fabricated from high temperature alloys such as, for example, "HAYNES HR-120", "INCONEL 601GC", "INCONEL 617", "VDM 602CA", "INCOLOY 800HT", "HAYNES A230", "INCOLOY MA956". Preferred high temperature alloys include those, such as "HAYNES HR-120", having long time to creep failures. At temperatures higher than 2000° F. (1093° C.), ceramic materials are preferred. Ceramic materials with acceptable strength at temperatures of 900° C. to about 1400° C. are generally high alumina content ceramics. Other ceramics that may be useful include chrome oxide, zirconia oxide, and magnesium oxide-based ceramics. National Refractories and Minerals, Inc., Livermore, Calif., A. P. Green Industries, Inc., Mexico, Mo., and Alcoa, Alcoa Center, Pa., provide such materials.

The preceding description of the present invention is exemplary and reference is to be made to the following claims to determine the scope of the present invention.

We claim:

1. A method for heating a subterranean diatomite formation, the method comprising:
   drilling a wellbore into the diatomite formation;
   inserting a heater into the wellbore;
   permitting the diatomite to close up around the heater without cementing at least a major portion of the heater into the formation; and
   firing the heater and thereby sintering the diatomite in the vicinity of the heater.

2. The method of claim 1 wherein the heater is a gas-fired flameless combustion heater.

3. The method of claim 1 further comprising the step of driving liquid hydrocarbons from the diatomite formation in the vicinity of the wellbore by injection of heat from the heater.

4. The method of claim 3 further comprising the step of providing a production wellbore and wherein the hydrocarbons driven from the formation in the vicinity of the wellbore are recovered from a production wellbore.

5. A heater for heating a subterranean diatomite formation comprising a heater placed in the formation without cement, and sintered diatomite in contact with the heater.

6. The heater of claim 5 wherein the heater is an electrical heater.

7. The heater of claim 5 wherein the heater is a gas-fired heater.

8. The heater of claim 7 wherein the gas-fired heater utilizes flameless combustion.

9. An apparatus for injecting heat into a subterranean diatomite formation, the apparatus comprising:
- a combustion air conduit through which combustion air can be conducted from the surface to a mixing point, the combustion air conduit placed without cement directly in the diatomite formation;
- a return conduit through which gas can be conducted from the mixing point to the surface, the return conduit placed without cement directly in the diatomite formation;
- a fuel gas conduit through which fuel gas may be conducted from the surface to a mixing point within the formation to be heated, the fuel gas conduit being located within the combustion air conduit, the return conduit, or both;
- a means to conduct heat from the return conduit to the combustion air conduit, the fuel gas conduit or both;
- a heater surface capable of conducting heat from the return conduit to the formation; and
- an electrical heater in the return conduit, the electrical heater comprising a heated surface and the electrical heater being capable of providing a heated surface temperature above the autoignition temperature of a fuel gas and combustion air mixture.

10. The heater of claim 9 wherein the heater comprises a plurality of mixing points with a portion of the fuel gas released into the combustion air stream at each mixing point.

11. The heater of claim 9 wherein the electrical heater is in the return conduit after the last mixing point.

* * * * *